(12) United States Patent
Lindwer

(10) Patent No.: US 7,243,350 B2
(45) Date of Patent: Jul. 10, 2007

(54) SPECULATIVE EXECUTION FOR JAVA HARDWARE ACCELERATOR

(75) Inventor: Menno Menasshe Lindwer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 701 days.

(21) Appl. No.: 10/259,704

(22) Filed: Sep. 27, 2002

(65) Prior Publication Data

US 2003/0084271 A1    May 1, 2003

(30) Foreign Application Priority Data

Oct. 2, 2001  (EP) .................. 01402545

(51) Int. Cl.
| | |
|---|---|
| G06F 9/455 | (2006.01) |
| G06F 9/30 | (2006.01) |
| G06F 9/40 | (2006.01) |
| G06F 15/10 | (2006.01) |
| G06F 7/38 | (2006.01) |
| G06F 9/00 | (2006.01) |
| G06F 9/44 | (2006.01) |

(52) U.S. Cl. .................. 718/1; 712/209; 712/229; 712/233; 712/234; 712/237; 712/239

(58) Field of Classification Search ................ 712/240, 712/209, 229, 233, 234, 237, 239; 719/324; 718/1

See application file for complete search history.

(56) References Cited

U.S. PATENT DOCUMENTS

| | | | | |
|---|---|---|---|---|
| 4,477,872 A | * | 10/1984 | Losq et al. | 712/240 |
| 4,760,520 A | * | 7/1988 | Shintani et al. | 712/239 |
| 4,764,861 A | * | 8/1988 | Shibuya | 712/207 |
| 4,777,594 A | * | 10/1988 | Jones et al. | 712/240 |
| 4,827,402 A | * | 5/1989 | Wada | 712/234 |
| 4,853,840 A | * | 8/1989 | Shibuya | 712/237 |
| 4,858,104 A | * | 8/1989 | Matsuo et al. | 712/240 |
| 5,136,696 A | * | 8/1992 | Beckwith et al. | 712/240 |
| 5,228,131 A | * | 7/1993 | Ueda et al. | 712/240 |
| 5,454,117 A | * | 9/1995 | Puziol et al. | 712/23 |
| 6,093,213 A | * | 7/2000 | Favor et al. | 703/27 |
| 6,332,215 B1 | * | 12/2001 | Patel et al. | 717/141 |
| 6,338,133 B1 | * | 1/2002 | Schroter | 712/214 |
| 6,374,351 B2 | * | 4/2002 | Tremblay | 712/239 |
| 6,453,278 B1 | * | 9/2002 | Favor et al. | 703/27 |
| 6,530,016 B1 | * | 3/2003 | Ukai et al. | 712/237 |
| 6,854,048 B1 | * | 2/2005 | Dice | 712/216 |

OTHER PUBLICATIONS

Li et al., Branch Behavior of Java Runtime Systems and its Microarchitectual Implications, 2000, CiteSeer.IST.*

* cited by examiner

*Primary Examiner*—Meng-Al T. An
*Assistant Examiner*—Qing-Yuan Wu

(57) ABSTRACT

Conditional branch bytecodes are processed by a Virtual Machine Interpreter (VMI) hardware accelerator that utilizes a branch prediction scheme to determine whether to speculatively process bytecodes while waiting for the CPU to return a condition control variable. The VMI assumes the branch condition will be fulfilled if a conditional branch bytecode calls for a backward jump and that the branch condition will not be fulfilled if a conditional branch bytecode calls for a forward jump. Alternatively, the VMI makes an assumption only if a conditional branch bytecode calls for a backward jump or the VMI assumes that the branch condition will be fulfilled whenever it processes a conditional branch bytecode. The VMI only speculatively processes bytecodes that are easily reversible, and suspends speculative processing of bytecodes upon encountering a bytecode that is not easily reversible. If a VMI assumption is invalidated, any speculatively processed bytecodes are reversed.

17 Claims, 3 Drawing Sheets

CPU pipeline 200

| Stage | | | | | | | | |
|---|---|---|---|---|---|---|---|---|
| Stage 1 | I1 | I2 | I3 | I4 | I5 | I6 | I7 | I8 |
| Stage 2 | | I1 | I2 | I3 | I4 | I5 | I6 | I7 |
| Stage 3 | | | I1 | I2 | I3 | I4 | I5 | I6 |
| Stage 4 | | | | I1 | I2 | I3 | I4 | I5 |
| Stage 5 | | | | | I1 | I2 | I3 | I4 |
| Stage 6 | | | | | | I1 | I2 | I3 |
| Stage 7 | | | | | | | I1 | I2 |
| Stage 8 | | | | | | | | I1 |
| ... | | | | | | | | |

SPECULATIVE EXECUTION FOR JAVA HARDWARE ACCELERATOR

FIELD OF THE INVENTION

The present invention relates generally to computer programming languages, and more particularly to the translation and execution of a virtual machine language.

BACKGROUND OF THE INVENTION

Computer programming languages are used to create applications consisting of human-readable source code that represents instructions for a computer to perform. Before a computer can follow the instructions however, the source code must be translated into computer-readable binary machine code.

A programming language such as C, C++, or COBOL typically uses a compiler to generate assembly language from the source code, and then to translate the assembly language into machine language which is converted to machine code. Thus, the final translation of the source code occurs before runtime. Different computers require different machine languages, so a program written in C++ for example, can only run on the specific hardware platform for which the program was written.

Interpreted programming languages are designed to create applications with source code that will run on multiple hardware platforms. Java™ is an interpreted programming language that accomplishes platform independence by generating source code that is converted before runtime to an intermediate language known as "bytecode" or "virtual machine language." At runtime, the bytecode is translated into platform-appropriate machine code via interpreter software, as disclosed in U.S. Pat. No. 4,443,865. To interpret each bytecode, interpreter software performs a "fetch, decode, and dispatch" (FDD) series of operations. For each bytecode instruction the interpreter software contains a corresponding execution program expressed in native central processing unit (CPU) instructions. The interpreter software causes the CPU to fetch or read a virtual machine instruction from memory, to decode the CPU address of the execution program for the bytecode instruction, and to dispatch by transferring control of the CPU to that execution program. The interpretation process can be time-consuming.

As disclosed in PCT Patent Application No. WO9918484 adding a preprocessor (a virtual machine interpreter (VMI)) between a memory and a CPU improves the processing of virtual machine instructions. In essence, the virtual machine is not a physical structure, but rather is a self-contained operating environment that interprets bytecode for the hardware platform by selecting the corresponding native machine language instructions that are stored within the VM or in the CPU. The native instructions are then supplied to and consecutively executed in the CPU of the hardware platform. A typical virtual machine requires 20–60 cycles of processing time per bytecode (depending on the quality and complexity of the bytecode) to perform an FDD series of operations. First, a VMI reads (fetches) a bytecode from memory. Next, the VMI looks up a number of properties of (decodes) the fetched bytecode. The properties accessed by the VMI determine how the bytecode will be processed into native instructions for execution in the CPU. While the CPU is executing an instruction, the VMI fetches and processes the next bytecode into CPU instructions. The VMI can process simple bytecodes in 1–4 cycles.

While interpreting a sequence of bytecodes, a virtual machine may encounter a bytecode that represents a conditional branch instruction, hereinafter referred to as a CBI. When a CBI is encountered, the VMI generates a sequence of native instructions that causes the CPU to determine whether the condition is fulfilled. The decision to execute the branch therefore depends on earlier computations, which in the VMI concept were executed in the CPU with the results remaining in CPU registers. For example, the Java™ bytecode "ifeq n" offsets the bytecode counter by "n", but only if the top of the stack is zero (i.e., the previous computation left the value 0 on the stack). The value of the branch condition (here, the top of the stack) must be retrieved and written to the control register of the VMI (which is reserved specifically for branch conditions). If the condition has been fulfilled, the CBI causes an update to the VMI bytecode counter (a jump) which alters the sequence of bytecodes to be executed. Typically, when one instruction is being processed in the VMI the next instructions to be processed are already in the VMI pipeline, so if an instruction results in a branch the bytecodes already in the VMI pipeline must be flushed. Additionally, the "pipelined" structure of processor hardware creates an inherent delay for transporting instructions and data between the instant that the instructions and/or data are dispatched to the processor and the instant when the processor effectively executes the instruction and/or processes the data. Specifically, because the typical CPU has a multistage (typically, 3 to 8 stages) pipeline the write operation will not be executed immediately after the instruction is issued. In the case of a CBI, additional delay occurs while the CPU determines whether the condition is fulfilled and transfers the result of this determination to the VMI. If the value of the branch condition (the control value) indicates that the branch condition is fulfilled, several (depending on the size of the CPU pipeline) instructions will already have entered the CPU pipeline. To keep the CPU and instruction cache busy, a series of "no operation" (NOP) commands can be generated while waiting for the control value that indicates whether the condition is fulfilled. The control value is received while the CPU executes the next to the last NOP and the VMI generates the last NOP. After making the determination, the VMI's pipeline requires several cycles for the VMI to retrieve the bytecode representing the next instruction from the VMI's cache.

Other approaches speculatively execute potential branch instructions by predicting whether an instruction will result in a branch to another location. An example of this approach is directed to RISC (Reduced Instruction Set Computing) microprocessors, and provides a branch instruction bit to determine which conditional branches are "easy" to predict, and for those branches, uses software branch prediction to determine whether to execute the jump. Software branch prediction predicts branches using a software-controlled prediction bit. If the branch is determined to be "hard" to predict, the branch is predicted using hardware branch prediction (such as a branch prediction array). This approach discloses using a branch prediction scheme which predicts that a branch will be taken if the offset is less than zero (a backward branch) and that a branch will not be taken if the offset is greater than zero (a forward branch). A disadvantage of this approach is the consumption of processor resources for the making and updating the ease-of-prediction determination, which is based upon whether historical operation of the branch taken is important in determining whether the branch will be taken.

In another branch prediction approach, bits from the address of the potential branch instruction are compared to bits concatenated from a local branch history table and a global history register. The result of the comparison is used to read a branch prediction table. A disadvantage of this approach is the consumption of resources required to perform the concatenation and comparison operations and to store and access the branch prediction table. Furthermore, the approach does not disclose a means of correcting mispredictions. A similar methodology is disclosed in U.S. Pat. No. 5,136,696, wherein a branch prediction is made by the branch cache based on the address of a potential branch instruction. According to that disclosure, where the prediction is wrong the corresponding instruction is invalidated but is executed anyway, so that the branch cache can be updated with the correct prediction in case the same instruction is encountered again. The CPU pipeline is flushed during the same cycle as the branch cache update by invalidating all of the instructions in the first seven stages of the pipeline and loading the contents of a program counter register.

Because conditional branches occur frequently (approximately 10% of all virtual machine instructions) and are process-intensive when processed according to existing approaches which achieve high accuracies but consume processor resources, there is a need for a system of interpreting programming languages that accurately and efficiently executes instructions intended by conditional branch instruction bytecodes while increasing the processing speed.

SUMMARY OF THE INVENTION

The present invention fulfills the needs described above by configuring a virtual machine hardware accelerator (such as the VMI) such that when a conditional bytecode (CBI) is encountered the VMI performs branch prediction and elects whether to commence a speculative execution process. If elected, speculative execution continues as long as the speculatively executed bytecodes are easily reversible or until the prediction is confirmed. In most cases the prediction is correct, thereby enabling the VMI and CPU to continue operating along the sequence of bytecodes that was speculatively chosen after the prediction is confirmed. If the prediction is incorrect (and thus invalidated) the speculative processes executed in the VMI and the CPU are flushed and the VMI is returned to the state just before the branch. Efficiency is realized by combining the performance gains of virtual machine hardware acceleration technology with branch prediction schemes and potential speculative execution, and by speculatively executing instructions only as long as the effects can easily be reversed. Accuracy is achieved by correcting any misprediction. On average therefore, a conditional branch instruction (CBI) will introduce only a relatively small delay.

The present invention comports with more complex branch prediction methodologies (such as the hashing scheme and path history methodologies suggested in *Tuning Branch Predictors to Support Virtual Method Invocation in Java*, Proceedings of the Fifth USENIX Conference on Object-Oriented Technologies and Systems (1999), pp. 217–228), as well as with schemes that make simple (but probable) predictions based upon the type of each potential branch instruction encountered.

Briefly, the present invention includes systems and methods for processing conditional branch virtual machine instructions, which in the exemplary embodiment of the present invention are generated by the Java™ programming language. At the programming level, Java™ source code is compiled into an intermediate language called bytecode. Bytecode consists of virtual machine instructions that can be interpreted by a virtual machine for execution by a processor. According to the exemplary embodiment of the present invention, at runtime a virtual machine (in the exemplary embodiments, a VMI) is initialized. Parameters are initialized which enable the identification of certain properties of each bytecode. For example, bytecodes may be characterized as simple or complex, and can further characterized as conditional or recursive. A conditional bytecode is a virtual machine instruction that alters the sequence of bytecodes to be executed, but only if a branch condition is fulfilled.

The VMI proceeds to process each of a series of bytecodes into one or more native instructions. The VMI maintains a bytecode counter which is incremented after each bytecode is retrieved from an instruction memory. When a CBI is encountered, the VMI generates a sequence of native instructions that causes the CPU to determine whether the branch condition has been fulfilled, by retrieving the branch condition control value. According to the systems and methods of the exemplary embodiments of the present invention, rather than suspending processing until the control value retrieval is complete the VMI performs branch prediction and elects whether to perform speculative execution, i.e., whether to make an assumption as to whether the branch condition will be fulfilled. When an assumption is made, a bytecode sequence is speculatively executed until the assumption is confirmed or invalidated or until a bytecode that is not easily reversible is encountered.

In the first three embodiments of the present invention, the determination is based upon the type of branch that is designated by the CBI. According to the first embodiment, the VMI assumes that the branch condition is true if the CBI designates a backward branch, and updates the bytecode counter to jump to the next bytecode targeted by the branch. If the CBI designates a forward branch, the VMI assumes that the branch condition will not be fulfilled, and does not execute the branch. An alternative embodiment assumes that the branch condition is fulfilled if the CBI calls for a backward branch, but makes no assumption if the CBI calls for a forward branch. In another alternative embodiment, the VMI assumes that the branch condition is always fulfilled, and thus processes bytecodes along the speculative branch as long as the bytecodes along the speculative branch are easily reversible and until the assumption has been confirmed or invalidated.

In yet another embodiment a known branch prediction scheme is used to determine whether to speculatively execute a branch, but the VMI only speculatively processes bytecodes that are easily reversible, and then only until the assumption has been confirmed or invalidated. This methodology is described in detail below with respect to implementation with a VMI, but can be implemented with more branch prediction or speculative execution schemes.

According to the embodiments of the present invention, when an assumption has been made the VMI continues to dispatch native instructions to the CPU which are translations of successive bytecodes either along the speculatively executed branch or along the original sequence of bytecodes as long as these native instructions are easily reversible, such as instructions that involve stack manipulations (such as stack pushes). When an instruction that is not easily reversed is encountered, a series of "no operation" (NOP) commands are generated and dispatched by the VMI to keep the CPU busy until the control value is received. If the subsequently received control value indicates that the assumption is correct, the VMI thus continues to operate on the bytecodes present in the VMI pipeline and the CPU continues to operate on the native instructions in the CPU pipeline. If the subsequently received control value indicates that the assumption is incorrect (i.e., there has been a misprediction) the CPU is caused to return to the state just before the branch, thereby reversing the speculatively executed easily reversible bytecodes. Thus, reversal of a misprediction due to an incorrect assumption requires returning both the VMI and the CPU to their respective states just prior to the branch and is easily accomplished according to the characteristics of the speculatively executed bytecodes. For instance, in an embodiment of the present invention "easily reversible bytecode" is defined as a bytecode that performs only stack manipulations or that does not modify any state outside the VMI, so execution of a sequence of such bytecodes can be reversed by resetting the bytecode counter and the register stack pointer in the VMI. Other definitions of "easily reversible" can be implemented according to the present invention and some of those definitions may require that the pipelines of the VMI and the CPU be flushed to reverse speculatively executed bytecodes.

Another aspect of the present invention is the system for executing virtual machine instructions from an interpreted language such as Java™. The system includes a processor (the CPU) and a preprocessor (the VMI), an instruction memory, and a translator (a JVM). The processor contains and is configured to execute hardware-specific instructions, hereinafter referred to as native instructions. The preprocessor is a virtual machine, for example a VMI, configured to fetch bytecode from the instruction memory and to translate the bytecode into native CPU instructions. The VMI includes a control register, a bytecode counter BCC, an assumption variable register, and a speculation mode switch history. In the exemplary embodiment of the present invention, the VMI is configured to dispatch native instructions called for by each bytecode to the CPU for processing. Where the processed bytecode is a CBI, the native instructions dispatched by the VMI cause the CPU to send a control value that indicates whether a branch is to be executed. The VMI is also configured to update the BCC to execute the jump called for by a CBI when it has been speculated or confirmed that the branch condition is fulfilled. While waiting for a control value, the VMI is configured to speculatively process or decline to process a branch based upon a branch prediction scheme according to the methods listed as the embodiments above. The VMI is configured to update the value of an assumption variable upon making or declining to make an assumption, by storing an assumed control value ACV. The VMI is configured to maintain a speculative mode switch history, which is updated when a sequence is speculatively executed or when speculative execution ceases, and is purged when a control value is received. After making the assumption that a branch should be speculatively executed, the VMI is configured to identify and process bytecodes that are reversible, to receive the control value, and to reverse speculatively executed bytecodes if the VMI subsequently receives a control value that indicates that the earlier assumption was incorrect.

Although it is possible to implement the methods of the present invention to process various types of conditional branch instructions, the exemplary embodiment of the present invention is directed to the processing of Java™ conditional branch bytecodes.

The present invention can be implemented in systems that execute Java™ bytecode using virtual machines, such as JVMs made by Sun Microsystems. However, the invention can also be implemented using other Java™ virtual machines such as the Microsoft Virtual Machine, and is also applicable to systems that execute other interpreted languages such as Visual Basic, dBASE, BASIC, and .NET.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

The accompanying drawings, which are incorporated in and form part of the specification, illustrate the present invention when viewed with reference to the description, wherein.

DESCRIPTION OF PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
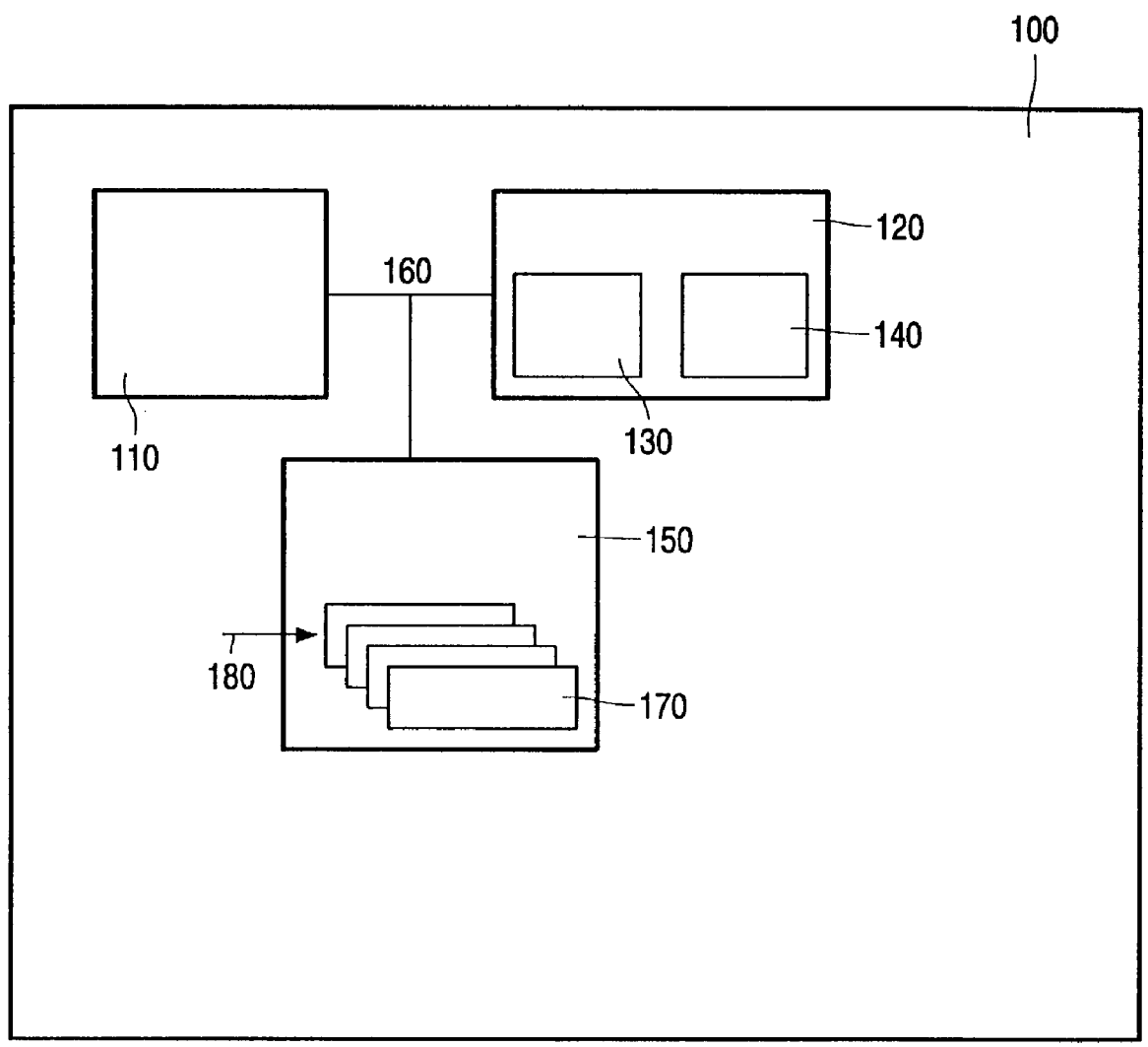
FIG. 1 is a block diagram that shows the functional elements of an exemplary embodiment of the environment of the present invention.

Referring now in detail to an exemplary embodiment of the present invention, which is illustrated in the accompanying drawings in which like numerals designate like components, FIG. 1 is a block diagram of the exemplary embodiment of the environment of the present invention. The basic components of the environment are a hardware platform 100 which includes a processor 110, a preprocessor 120, and an instruction memory 150 which are all connected by a system bus 160. The preprocessor 120 includes control register 130 and a translator 140. A hardware platform 100 typically includes a central processing unit (CPU), basic peripherals, an operating system (OS). The processor 110 of the present invention is a CPU such as MIPS, ARM, Intel x86, PowerPC, or SPARC type microprocessors, and contains and is configured to execute hardware-specific instructions, hereinafter referred to as native instructions. In the exemplary embodiment of the present invention, the translator 140 is a Java™ virtual machine (JVM), such as the KVM by Sun Microsystems. The instruction memory 150 contains virtual machine instructions, for example, Java™ bytecode 170. The preprocessor 120 in the exemplary embodiment is the Virtual Machine Interpreter (VMI) disclosed in WO9918486, and is configured to fetch a virtual machine instruction (for example, a bytecode 170) from the instruction memory 150 and to translate the virtual machine instruction into a sequence of native CPU instructions. The VMI 120 is a peripheral on the bus 160 and may act as a memory-mapped peripheral, where a predetermined range of CPU addresses is allocated to the VMI 120. The VMI 120 manages an independent virtual machine instruction pointer 180 indicating the current (or next) virtual machine instruction in the instruction memory 150. The VMI also manages a speculation mode switch history and an assumption variable (not shown).

Figures 2, 3:
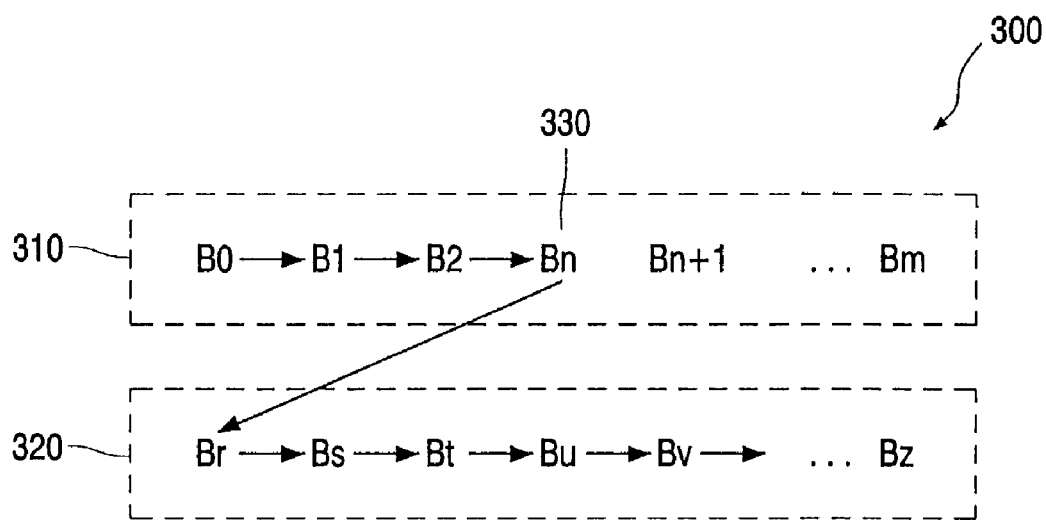
FIG. 2 is a chart that shows processing of instructions in the typical CPU pipeline.
FIG. 3 illustrates an exemplary bytecode processing sequence.

Referring now to FIG. 2 and according the exemplary embodiment of the present invention, the processor 110 includes a multi-stage pipeline 200 such that execution of machine instructions occurs in parallel and lockstep fashion during consecutive clock cycles. In other words, when a first instruction I1 enters stage two of the pipeline, the following instruction I2 enters stage one, and so on. Ideally, the instructions continue to enter the pipeline in consecutive cycles thereby enabling the concurrent processing of eight instructions where one instruction is completely executed every clock cycle. Typically however, execution of the average instruction actually requires more than one clock cycle.

As an example of the operation of the present invention, the VMI 120 proceeds to translate each of a first series 310 of bytecodes 170 into one or more native instructions. Referring now to FIG. 3, bytecodes B0 through B2 are non-conditional, so the VMI 120 simply fetches B0 through B2 from the instruction memory 150, selects the native instruction or instructions defined for each bytecode 170, and supplies the instruction(s) to the processor 110 for execution. Bn is a conditional branch instruction (CBI 330), therefore if the branch condition is fulfilled Bn causes the VMI to jump from the first sequence 310 to a bytecode Br in a sequence 320. While the branch condition is being evaluated (i.e., the VMI 120 waits for a control value to be returned from the CPU 110), a prediction is made according branch prediction scheme as to whether the branch condition will be fulfilled and the VMI 120 elects whether to speculatively execute instructions until the prediction can be verified. Branch prediction schemes are heuristic processes of varying complexities that provide predictions as to whether a branch condition will be fulfilled and possibly a statistical assessment of accuracy of the prediction. According to one embodiment of the present invention, the VMI 120 implements a branch prediction scheme that assumes that if the CBI 330 (Bn) calls for a backward branch (i.e., a negative offset to the bytecode counter BCC), the branch condition is fulfilled and the VMI 120 executes the jump to bytecode Br. The VMI 120 concurrently dispatches the sequence of native instructions that causes the CPU 110 retrieve the control value that indicates whether the branch condition has been fulfilled. According to the branch prediction scheme of another embodiment, if the CBI 330 (Bn) calls for a forward branch (i.e., a positive offset to the BCC), the VMI 120 assumes that the branch condition is not fulfilled and does not execute the jump. According to the branch prediction scheme of yet another embodiment, if the CBI 330 calls for a branch at all, the VMI 120 assumes that the branch condition is fulfilled and executes the jump.

According an exemplary embodiment of the present invention, if the branch prediction scheme results in speculative execution of a sequence 320 of bytecodes, the impact of an inaccurate prediction is minimized by speculatively executing only easily reversible bytecodes 170. Ease of reversal is determined when the bytecode 170 is decoded (i.e., its properties are accessed) by the VMI 120. The CPU 110 speculatively executes each dispatched instruction. For example, in many cases a branch is followed by a stack push operation (i.e. a constant or variable gets pushed on the stack), which can easily be reversed by resetting the stack pointer value (which is maintained in the VMI 120) to its state prior to the branch. Such native instructions (commonly referred to as "stack pushes") can be speculatively executed until the control value has been received, because reversing the speculative execution is accomplished by merely resetting a register, and thus the negative effects of a misprediction are negligible.

Thus, when the VMI 120 assumes that a branch condition will be fulfilled, processing of bytecodes Br through Bz (the speculative branch) subsequently continues in the second sequence 320 unless the VMI 120 encounters a bytecode along the speculative branch that represents a sequence of native instructions that cannot be easily reversed. When a bytecode 170 along the speculative branch cannot easily be reversed, speculative execution is suspended. If the VMI 120 subsequently receives a control value that indicates that the branch condition has not been fulfilled, the VMI 120 resets the BCC and the register stack pointer to reverse the jump (and if necessary, issues a native instruction to the CPU 110 to purge the CPU pipeline 200). If the VMI 120 assumes that a branch condition will not be fulfilled, the BCC is incremented and the branch is speculatively not processed. While speculatively processing non-branch bytecodes, the VMI 120 continuously checks whether the received control value has been written to its control register 130.

Figure 4:
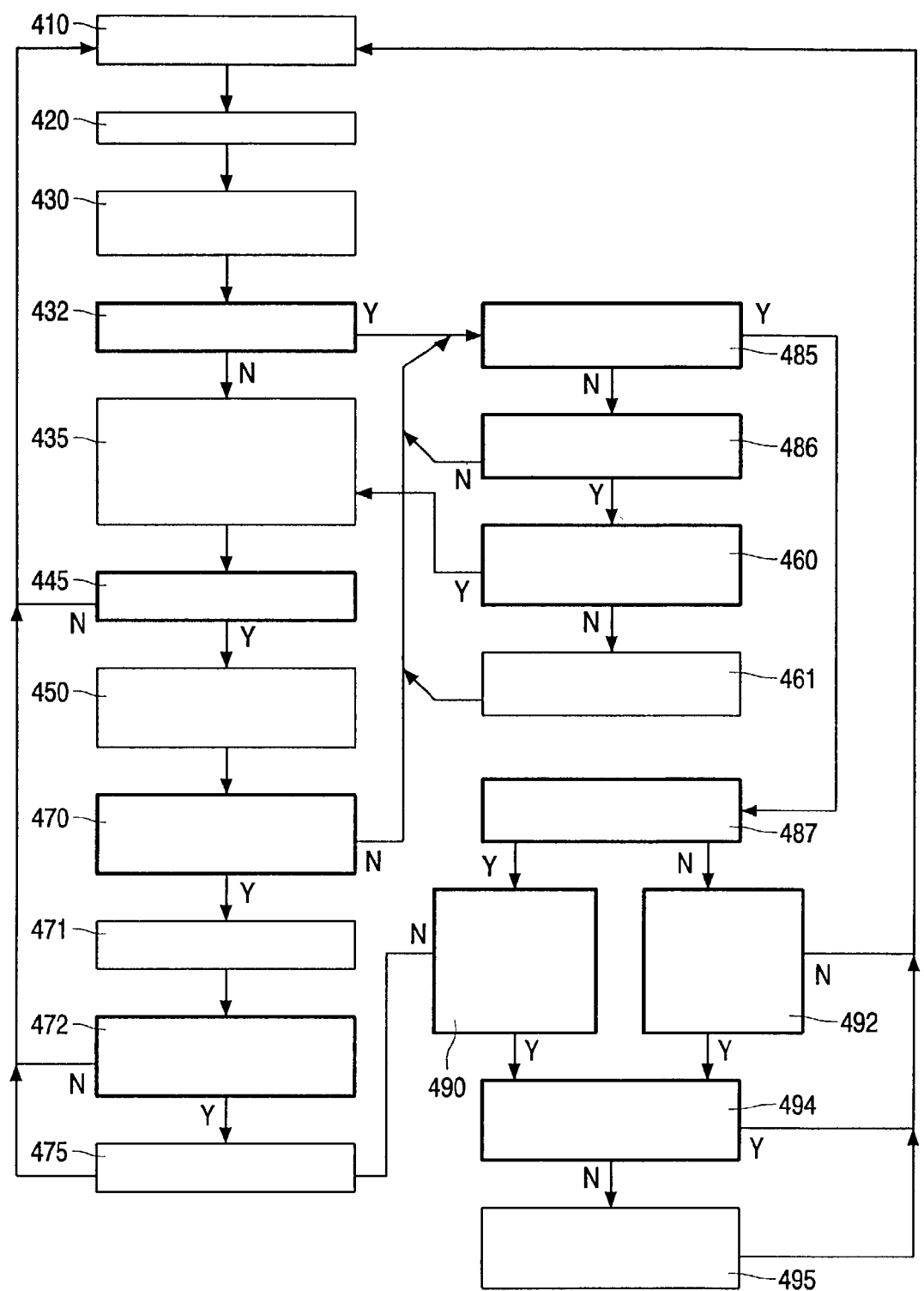
FIG. 4 charts the flow of a method according to an exemplary embodiment of the present invention.

As shown in block 410 of FIG. 4, the VMI 120 increments a virtual machine counter BCC before proceeding in block 420 to fetch each bytecode 170 from the instruction memory 150. In block 430, the VMI 120 decodes each bytecode 170 by accessing the properties for the bytecode 170. In block 430, that status of the speculation mode switch SMS is checked. Because the speculation mode switch SMS is off when the first bytecode 170 of a sequence has been decoded, the VMI 120 (in block 435) dispatches the sequence of native instructions that corresponds to the bytecode 170. If in block 445 it is determined that the bytecode 170 is not a CBI 330, the method returns to block 410 where the virtual machine counter (BCC) 180 is incremented, and the fetching process resumes (block 420). However, if it is determined in block 445 that the bytecode 170 is conditional, the native instructions dispatched in block 435 will represent a control value retrieval process within block 450. The native instructions that constitute the control value retrieval process will cause the CPU 110 to send a control value that indicates whether the branch called for by the CBI 330 is to be executed (i.e., whether to jump to a target bytecode 170 that is outside of the current sequence of bytecodes being executed), and to write that control value to the control register 130. Concurrently with the control value retrieval process, the VMI 120 elects (in block 470) whether to make an assumption that the branch condition will or will not be fulfilled. The election is based upon the particular branch prediction or speculative execution scheme in use.

If the VMI 120 elects to make an assumption as to the fulfillment of the branch condition, in block 471, the speculation mode switch (SMS) is turned on and an assumed control value (ACV) is stored in a VMI register (the assumption variable 195). In block 475, the BCC is updated (to reflect the jump called for by the CBI 330) if the branch is speculatively taken as determined in block 472. Regardless of whether the branch is speculatively taken, the method proceeds to block 410 where the BCC is incremented. The next bytecode 170 along the speculatively elected sequence of bytecodes is processed if it is reversible (e.g., the native instructions corresponding to the next bytecode 170 constitute a simple stack manipulation). The determination of ease of reversibility is based upon the properties of the bytecode 170. Easily reversible bytecodes typically represent operations that take place on stack positions above the top-of-stack just after the CBI 330 translation and that do not modify the state of the system (in particular, outside the VMI 120). The bytecode 170 is fetched in block 420 and decoded in block 430. The SMS is on because the VMI 120 elected to make an assumption (the sequence is being speculatively executed), so if the control value has not yet been returned (block 485) and the decoded properties indicate the fetched bytecode 170 is easily reversible, the native instructions corresponding to the fetched bytecode are dispatched in block 435. Then as long as the fetched bytecode 170 is not another CBI 330 (block 445), the BCC is incremented (block 410) and the next bytecode along the speculative sequence is fetched and decoded (blocks 420 and 430). Thus, the processing of a speculative sequence loops through blocks 410, 420, 430, 432, 485, 486, 460, and 435 as long as each next bytecode 170 is easily reversible, and as long as the branch condition has not been received.

If in block 460 a bytecode 170 that is not easily reversible is encountered during the processing of a speculative sequence, speculation is discontinued in block 461 by switching the SMS off, which causes the VMI 120 to wait for receipt of the control value in block 485. The received control value RCV is stored in the control register 130 of the VMI 120. In block 487, the branch condition is evaluated. If the RCV indicates that the branch condition was fulfilled and the SMS history indicates that current sequence was being speculatively processed (the SMS history shows that the SMS has been on at some point during the current sequence) in block 494 the assumed control value ACV stored as the assumption variable is compared to the received control value RCV stored in the control register 130 to determine whether the assumption made by the VMI 120 was correct (i.e., whether the speculative sequence should have been processed). If the assumption was correct (i.e., ACV=RCV) then the speculative execution of the current branch sequence has been confirmed. In other words, the VMI 120 correctly assumed that the branch should be taken. The BCC is incremented in block 410 and fetching resumes. If the assumption was incorrect then the VMI 120 failed to process the branch, and the VMI 120 and the CPU 110 are flushed to reverse the speculatively processed non-branch sequence of bytecodes, the method updates the BCC to reflect the jump in block 495 and then returns to block 410 to increment the BCC and process the next bytecode along the branch sequence.

If the RCV indicates that the branch condition was not fulfilled and the SMS history indicates that current sequence was being speculatively processed, in block 494 the assumed control value ACV is compared to the received control value RCV to determine whether the assumption made by the VMI 120 was correct. If the assumption was correct then the speculative execution of the current non-branch sequence has been confirmed. In other words, the VMI 120 correctly assumed that the branch should not be taken. The BCC is incremented in block 410 and fetching resumes. If the assumption was incorrect then the branch should not have been taken, and all bytecodes along the speculatively processed branch are reversed by resetting the BCC and the stack register pointer in block 495. If necessary, the pipelines of the VMI 120 and the CPU 110 are flushed in block 495.

The SMS history is reset whenever a control value is received because the branch condition has been resolved thus confirming or purging any speculative processes.

If the VMI 120 elects in block 470 not to make an assumption as to the fulfillment of the branch condition, the VMI 120 waits until the actual control value is received by checking in block 485 for receipt of the control value. Because the SMS remains off, block 486 returns to block 485 to continue checking until the control value is received. When the control value is received, the method proceeds to block 487, where the branch condition is evaluated. If the control value indicates that the branch condition was fulfilled, because no speculation has occurred during execution of the bytecode sequence, the method proceeds to block 495 where the BCC is updated to reflect the jump called for by the CBI 330 and then bytecode fetching is resumed in block 410. If the control value indicates that the branch condition was not fulfilled, the method returns to block 410 to resume bytecode fetching. In this manner, if the VMI 120 elects not to make an assumption the VMI 120 processes the CBI 330 normally (taking the branch only if the branch condition is fulfilled).

As discussed above, the decision whether to make an assumption regarding the fulfillment of the branch condition is based upon the branch prediction scheme implemented, as illustrated below.

| Branch Prediction Schemes | | |
| --- | --- | --- |
| | Backward Branch | Forward Branch |
| First embodiment | Assume taken | Assume not taken |
| Second embodiment | Assume taken | No assumption |
| Third embodiment | Assume taken | Assume taken |
| Fourth embodiment | Depends on prediction scheme | |

In a first embodiment of the present invention, the VMI 120 utilizes a speculative execution scheme that assumes that backward branches will be taken, and that forward branches will not be taken. In a second and alternative embodiment, the VMI 120 speculatively executes only backward branches, and makes no assumption regarding forward branches. In a third and alternative embodiment, the VMI 120 utilizes a simpler speculative execution scheme that assumes that all branches will be taken. Furthermore, according to a fourth and alternative embodiment the VMI 120 utilizes a branch prediction scheme to determine whether the branch is to be taken. According to any of the forgoing embodiments, speculative execution only proceeds for bytecodes that are easily reversible.

According to the first embodiment of the present invention, the VMI 120 always makes an assumption regarding the outcome of the branch condition represented by a CBI 330, but bases the speculation upon the type branch called for by the CBI 330. If the CBI 330 calls for a forward branch (BCC offset>0) the VMI 120 assumes that the branch condition will not be fulfilled and speculatively continues to process a non-branch bytecode sequence as long as it is easily reversible. If the CBI 330 calls for a backward branch (BCC offset<0) the VMI 120 assumes that the branch condition will be fulfilled and speculatively processes the branch bytecode sequence as long as it is easily reversible.

According to the second embodiment of the present invention, the VMI 120 makes an assumption regarding the outcome of the branch condition represented by a CBI 330 only if the CBI 330 calls for a backward branch. Where the CBI 330 calls for a forward branch the VMI 120 processes the branch condition normally, i.e., the VMI 120 waits for receipt of the control value and processes the appropriate sequence of bytecodes accordingly.

In a third embodiment of the present invention, a scheme speculates that the branch is always taken when a CBI is encountered. When processing RISC code this speculative execution scheme is accurate approximately 70% of the time because branches usually occur at the bottom of a loop, and loops are typically executed repeatedly. The branch prediction improves the overall RISC code processing performance of VMI by approximately 35%. According to Amdahl's law, when processing Java code this simple prediction will increase bytecode processing speed by 7–20%. Using branch prediction and speculative operation, the overhead of branches as compared to a natively executing CPU can be reduced from 10 to 20 cycles to approximately 2 to 4 cycles. According to an aspect of the third embodiment, when the VMI 120 assumes that a branch condition has been fulfilled the VMI 120 updates the bytecode counter BCC to reflect the branch offset, starts fetching from the offset address and recovers its pipeline. If the assumption is correct, the time required to process that branch is reduced to about 5 cycles. However, it cannot be concluded that branch prediction according to this embodiment of the present invention would reduce the processing time for every branch by an approximate factor of three (from 14 to 5 cycles) because approximately 10% of all branches results in cache misses.

In a fourth embodiment, any known branch prediction scheme is utilized in combination with the VMI 120 to process each CBI 330.

Many of the advantages of the systems and methods of the present invention are described herein, although those skilled in the art will recognize other advantages exist. For example, for optimal bus usage the CPU 110 reads native instructions in bursts (typically consisting of at least 4 cycles). Therefore the CPU 110 must read an entire burst before it will send the control value back to the VMI 120. The VMI 120 must generate some NOPs to fill the burst containing the control value retrieval command so as to ensure that the CPU 110 processes the retrieval command while the VMI 120 processes a speculative branch. An advantage of the present invention is that when a the VMI 120 keeps the CPU 110 and VMI 120 pipelines filled with meaningful instructions by speculatively dispatching the next instructions from the speculative sequence 320 as long as the effects of each instruction can be reversed, rather than having to occupy processor time with NOPs to fill the CPU burst.

In view of the foregoing, it will be appreciated that the present invention provides a system and a method for accurate and efficient processing of conditional branch virtual machine instructions. Still, it should be understood that the foregoing relates only to the exemplary embodiments of the present invention, and that numerous changes may be made thereto without departing from the spirit and scope of the invention as defined by the following claims.

The invention claimed is:

1. A method of processing virtual machine instructions, the method comprising the acts of:

identifying a subset of virtual machine instructions the processing of which is conditionally dependent upon the value of a condition control variable;

fetching and processing a range of the virtual machine instructions into native instructions executable by a processor, wherein a virtual machine instruction counter is incremented after processing and dispatching to the processor for execution a virtual machine instruction of said range, and continuing until a member of said subset of the virtual machine instructions is encountered;

initiating a control value retrieval process upon encountering said member, by dispatching native instructions represented by said member to the processor for execution;

processing a speculative sequence of virtual machine instructions when an assumption has been made for an assumed value of a real value of the condition control variable, by:

switching a speculative mode switch on;

updating the virtual machine instruction counter according to the assumed value, so as to process into native instruction each virtual machine instruction of said speculative sequence of virtual machine instructions, incrementing the virtual machine instruction counter and dispatching the native instructions after each virtual machine instruction of said speculative sequence of virtual machine instructions is processed, until the real value of the condition control variable has been received;

comparing the real value to the assumed value;

reversing the processing of the speculative sequence of virtual machine instructions, purging a speculation mode history, and reversing the update to the virtual machine counter, if the real value is not equal to the assumed value; and switching said speculation mode switch off and purging said speculation mode history, if the real value is equal to the assumed value; and delaying further fetching and processing of the range of the virtual machine instructions until the real value of the condition control variable is received and then processing a next virtual machine instruction of the range according to the real control value, if no assumption is made for the assumed value of the real value of the condition control variable;

wherein the act of processing said speculative sequence of virtual machine instructions further comprises the acts of:

identifying as easily reversible virtual machine instructions that are stack manipulations including at least one of a stack push operation which is reversible by resetting a stack pointer value, and a bytcode that does not modify a state outside a virtual machine interpreter that is configured to process the easily reversible virtual machine instructions;

processing each virtual machine instruction of said speculative sequence until encountering a virtual machine instruction of the speculative sequence which is not easily reversible; and suspending processing-of said speculative sequence of virtual machine instructions until the real value of the condition control variable is received, if the next virtual machine instruction of the speculative sequence is not easily reversible.

2. The method of claim 1, wherein fetching and processing of said range of the virtual machine instructions into native instructions executable by a processor is accomplished by a Virtual Machine Interpreter (VMI) virtual machine hardware accelerator.

3. The method of claim 1, wherein suspending processing of said speculative sequence further comprises the act of dispatching to the processor a series of "no operation" instructions until the real value of the condition control variable is received.

4. The method of claim 2, wherein determining whether to make an assumption for the assumed value of the real value of the condition control variable further comprises the acts of:
  determining a displacement to the virtual machine counter that is called for by said member of said identified subset of virtual machine instructions; and
  setting the assumed value of the condition control variable to indicate that the branch condition is fulfilled, if the member of said identified subset of virtual machine instructions calls for a negative displacement (offset<0) of the virtual machine counter.

5. The method of claim 4 further comprising the act of setting the assumed value of the condition control variable to indicate that the branch condition is not fulfilled, if the member of said identified subset of virtual machine instructions calls for a positive displacement (offset>0) of the virtual machine counter.

6. The method of claim 4 further comprising the act of making no assumption for the real value of the condition control variable, if the member of said identified subset of virtual machine instructions calls for a positive displacement (offset>0) of the virtual machine counter.

7. The method of claim 2, wherein determining whether to make an assumption for the assumed value of the real value of the condition control variable further comprises the act of setting the assumed value of the condition control variable to indicate that the branch condition is fulfilled.

8. The method of claim 2, wherein determining whether to make an assumption for the assumed value of the real value of the condition control variable further comprises the act of setting the assumed value of the condition control variable according to a branch prediction scheme.

9. The method of claim 2, wherein determining whether to make an assumption for the assumed value of the real value of the condition control variable further comprises the act of setting the assumed value of the condition control variable according to a speculative execution scheme.

10. A method of processing virtual machine instructions, the method comprising the acts of:
  fetching and processing a range of the virtual machine instructions into native instructions executable by a processor, and continuing until a conditional branch instruction is encountered;
  initiating a control value retrieval process by dispatching a native instruction represented by the conditional branch instruction to the processor for execution, upon encountering the conditional branch instruction;
  determining whether to make an assumption as to a value of a condition control variable;
  processing a speculative sequence of virtual machine instructions when the assumption is made as to the value of the condition control variable, by:
    identifying as easily reversible virtual machine instructions that are stack manipulations including at least one of a stack push operation which is reversible by resetting a stack pointer value, and a bytecode that does not modify a state outside a virtual machine interpreter that is configured to process the easily reversible virtual machine instructions;
    processing a virtual machine instruction of said speculative sequence of virtual machine instructions into a preliminary native instruction, only if the virtual machine instruction of said speculative sequence is easily reversible; and
    suspending processing of said speculative sequence of virtual machine instructions until the value of the condition control variable is received, if the virtual machine instruction of the speculative sequence is not easily reversible;
  delaying further fetching and processing of the range of the virtual machine instructions until the value of the condition control variable is received; and
  processing a next virtual machine instruction of the range according to the received value, if no assumption is made as to the value of the condition control variable.

11. The method of claim 10, wherein processing the speculative sequence of virtual machine instructions further comprises the acts of:
  comparing the value of the received condition control variable to an assumed value;
  reversing the processing of the speculative sequence of virtual machine instructions, purging a speculation mode history, if the value of the condition control variable is not equal to the assumed value; and
  switching said speculation mode switch off, and purging said speculation mode history, if the value of the condition control variable is equal to the assumed value.

12. An apparatus for processing virtual machine instructions, comprising:
  a processor having a native instruction set and configured to execute native instructions;
  an instruction memory, configured to store virtual machine instructions;
  a preprocessor, configured to fetch virtual machine instructions from the instruction memory and to process the fetched virtual machine instructions into native instructions executable by the processor, to identify conditional virtual machine instructions of the fetched virtual machine instructions, to determine whether to speculatively process virtual machine instructions while waiting for a value of a condition control variable being sent by the processor, and to confirm or reverse said speculatively processed virtual machine instructions upon receipt of the value of the condition control variable,
  a control register, configured to store the value of the condition control variable received from the processor;
  a virtual machine instruction counter, configured to indicate a next virtual machine instruction of the fetched virtual machine instructions to be processed;
  an assumption variable register, configured to store an assumed value of an assumed control variable;
  a speculation mode bit, configured to indicate whether the preprocessor has made an assumption regarding the value of the condition control variable; and
  a speculation mode history, configured to store speculation mode bits while waiting for the value of the control variable;
  said preprocessor being further configured to:
  identify as easily reversible virtual machine instructions that are stack manipulation including at least one of a stack push operation which is reversible by resetting a stack pointer value, and a bytecode that does not modify a state outside a virtual machine interpreter that is configured to process the easily reversible virtual machine instructions;
  speculatively process only the easily reversible virtual machine instructions; and
  suspend speculative processing of virtual machine instructions until the value of the condition control variable is received when a virtual machine instruction that is not easily reversible is encountered.

13. The apparatus of claim 12, wherein the preprocessor is a Virtual Machine Interpreter virtual machine hardware accelerator.

14. The apparatus of claim 12, wherein the preprocessor is further configured to switch said speculation mode bit off and purging said speculation mode history, if a real value of the received condition control variable is equal to the assumed value.

15. The apparatus of claim 14, wherein the preprocessor is further configured to dispatch a series of "no operation" instructions while speculative processing is suspended and until the value of the condition control variable is received.

16. The apparatus of claim 12, wherein the preprocessor is further configured to speculatively process only virtual machine instructions that represent a change of a value in a stack, and to suspend speculative processing of virtual machine instructions until the value of the condition control variable is received when a virtual machine instruction that is not the stack manipulation is encountered.

17. The apparatus of claim 16, wherein the preprocessor is further configured to dispatch a series of "no operation" instructions while speculative processing is suspended and until the value of the condition control variable is received.

* * * * *